United States Patent Office 3,442,636
Patented May 6, 1969

3,442,636
APPARATUS FOR THE MANUFACTURE OF SHEET GLASS UTILIZING GAS-PERMEABLE VERTICAL DAMPERS
Hideo Kita, Amagasaki-shi, and Kunihiko Ito, Nishinomiya-shi, Japan, assignors to Nippon Sheet Glass Co., Ltd., Osaka, Japan
Filed Aug. 13, 1965, Ser. No. 479,519
Claims priority, application Japan, Aug. 22, 1964, 39/47,655
Int. Cl. C03b *18/02*
U.S. Cl. 65—182                    2 Claims

ABSTRACT OF THE DISCLOSURE

An apparatus for use in the production of sheet glass in which the molten glass flows through a horizontal elongated slit onto a molten metal bath. The slit comprises a plurality of closely adjacent vertical movable damper members having the portion thereof adjacent to the slit and extending upward away from the slit a short distance of a gas-permeable material.

---

The present invention relates to an apparatus for the manufacture of a continuous sheet of glass from a glass melting furnace. More particularly the invention relates to the structure of a slit through which molten glass is passed in the manufacture of a continuous ribbon of sheet glass.

A method for the manufacture of sheet glass by flowing the molten glass through a slit and onto a bath of molten metal, and then drawing the same under suitable tension is known in the prior art. However, in such method, it is substantially impossible to insure the uniform thickness of the product over its entire width. To wit, a conventional damper for varying the vertical space of the slit tends to have adhered thereto, and be corroded by, the molten glass and therefore it is apt to form objectionable cords and blisters in the product. Furthermore, it is difficult for such a damper to move vertically, which in turn makes it difficult to control the amount of the flow of the molten glass. When such a damper is divided into a plurality of small dampers, the molten glass enters into the spaces between the small dampers to be solidified in situ, rendering the relative movements of each of the small dampers extremely difficult. Thus, it has been next to impossible to precisely control the thickness of the resultant sheet glass widthwise when a conventional damper is used.

An object of the persent invention is to provide an improved apparatus for the manufacture of sheet glass having a uniform thickness the surface of which is smooth and lustrous, and to overcome the above-described deficiencies and disadvantages inherent in the conventional techniques.

The above object of this invention is achieved in accordance with the present invention by providing a slit through which molten glass is passed in order to be formed into a continuous sheet, which slit consists of a pair of spaced lips, at least one of the lips being composed of a plurality of small dampers arranged in parallel to form the entire width of the lip, and each one of the small dampers being relatively movable so that the slit space between the lips at the corresponding position to each of the dampers can be varied to control the amount of the molten glass flowing therethrough and being composed of a porous material to allow a gas under pressure introduced thereinto to blow out through the surfaces thereof toward the molten glass layer passing through the slit.

Figure 1:
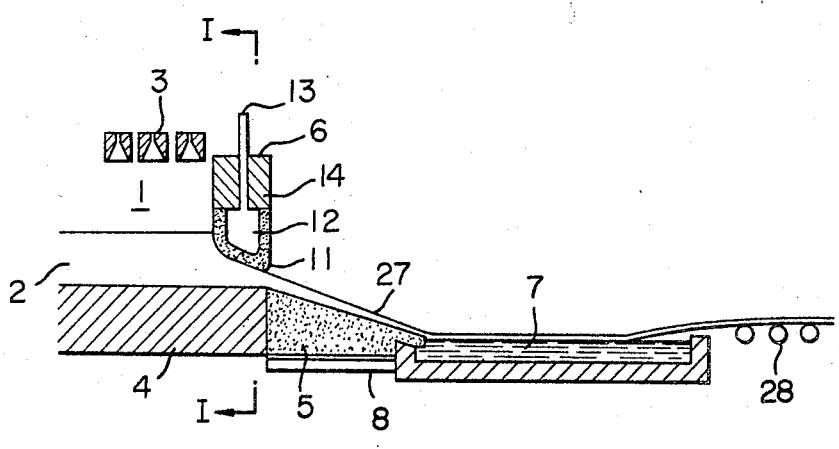
Figure 2:
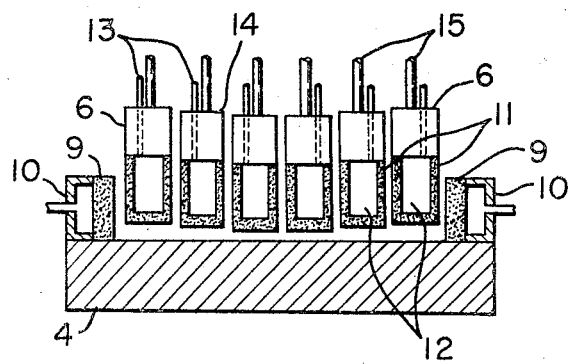
Figure 3:
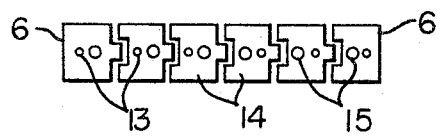
Figure 4:
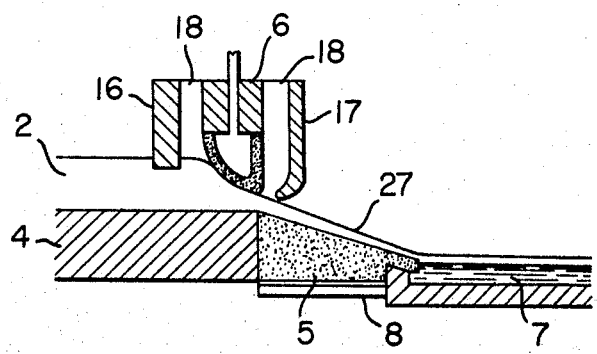
Figure 5:
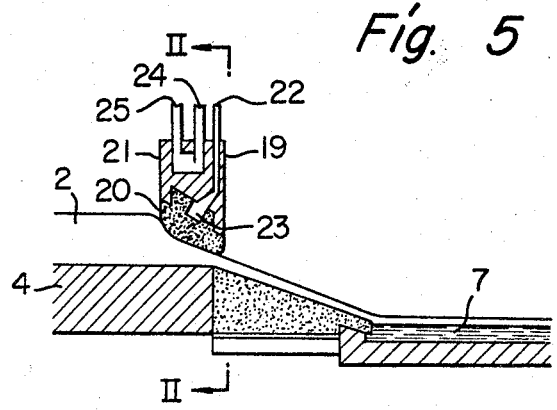
Figure 6:
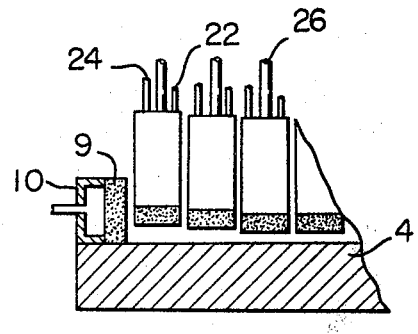

The embodiments of the invention will now be described with reference to the accompanying drawings wherein, FIG. 1 is a vertical sectional view illustrating one embodiment of the present invention; FIG. 2 is a transverse sectional view along the line I—I in FIG. 1; FIG. 3 is a top view of FIG. 2; FIGS. 4 and 5 are vertical sectional views showing other embodiments of the invention; and FIG. 6 is a partial transverse sectional view along the line II—II in FIG. 5.

With reference to FIG. 1, a mass of molten glass 2 in a forehearth 1 of a melting tank is heated to an optimum temperature for the shaping thereof by a burner 3. The widthwise temperature distribution of said mass of molten glass 2 is suitably adjusted. The molten glass 2 then passes through the slit between a bottom 4 or a member 5 having an inclined top and a damper 6 and reaches a bath 7 of molten metal. The thickness of the sheet glass produced therefrom is roughly determined during the passage of the molten glass 2 under the damper 6. At least the lower portion of the damper 6 is composed of a porous material into which a gas under pressure is fed. Graphite or porcelain refractories having a porosity of 20–30% and finished surfaces can be used as the porous material. The member 5 having an inclined top is formed of a refractory material resistant to corrosion by glass, or of a material on which molten glass slides readily, such as graphite. Below the member 5, a cooler 8 is provided to control the surface temperature of the member 5. FIG. 2 shows a transverse section of the slit portion of the apparatus shown in FIG. 1. The side wall 9 is also formed of a porous material, and a gas under pressure is introduced into a member 10.

As shown in FIGS. 2 and 3, a plurality of dampers 6 are arranged in parallel to form the entire width of the upper lip of the slit. The end portion of the bottom 4 or the member 5 having an inclined top functions as the lower lip of the slit. Each of the dampers 6 is vertically movable in relation to the one immediately next to it. Therefore, by detecting the widthwise thickness of the sheet product and automatically and precisely controlling the vertical positions of the dampers in accordance therewith, the amount of the molten glass passing through the slit is controlled and sheet glass having a uniform thickness over its entire width can be continuously obtained. Inside the porous portions 11 of the dampers 6, back pressure chambers 12 are provided, into which the pressurized gas is fed through conduits 13. Parts 14 are formed of the same porous material comprising the portions 11 or of conventionally used refractory material or heat resistant steel. Members 15 are suspension rods for adjusting the vertical movements of the dampers 6.

The pressurized gas to be introduced into the back pressure chamber is nitrogen gas when the damper is composed of graphite, or air or a combustible gas, when the damper is made of porcelain. Graphite tends to erode in an oxidizing atmosphere. Partition walls 16 and 17 can be arranged in the proximity of the damper 6 to provide a chamber 18 filled with a protective gas ($N_2$) between the damper 6 and the partition walls 16 and 17 as shown in FIG. 4 in order to prevent the erosion of the graphite. When the damper is made of porcelain, such protection chamber 18 is unnecessary, and a combustible gas such as producer gas, propane gas or butane gas can be used. Under these conditions, the combustible gas burns on the surface of the molten glass layer, the resultant sheet of glass is given a highly lustrous surface. When a combustible gas is used, however, the surface temperature of the damper may become too high thus causing corrosion of the damper or adhesion of the molten glass to the damper, and therefore, it is recommended that the apparatus be provided with a water-cooling means. One example of such an apparatus is shown in FIGS. 5 and 6, in which the upper lip is formed by a divided damper 19, 20 is the porous and refractory portion thereof, 21 is the portion made of heat resisting steel, 22 is a conduit for a gas under pressure, 23 is a back pressure chamber, 24 is a conduit for feeding cooling water, 25 is a discharge pipe for the water, and 26 is a suspension rod to adjust the vertical position of the damper.

The gas is introduced into the chamber 23 by means of a compressor under a pressure on the order of 1–3 kg./cm.$^2$. If the pressure to too high, objectionable cords and blisters tend to be formed in the resultant glass, whereas if it is too low, the molten glass is apt to adhere to the damper. Accordingly, the optimum pressure should be maintained depending on the specific conditions of the individual case such as the thickness of the porous material and the temperature of the molten glass. Such cords are often produced on the surface of the glass as it passes under or between the dampers. They tend to be removed while the glass flows down in substantially the form of a ribbon after leaving the passage under or between the dampers, due to the high temperature possessed by the glass. Whereas, when the temperature of the gas used is low, the cord-like defects tend to appear on the glass surface. The gas may be heated in advance by a suitable heating means (not shown). It is sufficient to use a rather small amount of the gas, which may be in the order to 60 cm.$^3$/min. per 1 cm.$^2$ of the damper surface (at the standard conditions) or less.

The damper 6 may be placed above the member 5 having an inclined top. A sheet glass 27 shaped as described above passes along the inclined top of the member 5 to reach the bath 7 of molten metal. As the molten metal, for example, tin is used, which is maintained at a constant temperature, and the bath is placed in an atmosphere of reducing gas in order to prevent oxidation of the metal at the surface. The sheet glass 27 slides on the bath 7 of molten metal, while being cooled by a cooling means arranged thereabove (not shown) and with its gradual temperature fall, is solidified to such a degree that it can be put on a conveyor roller 28. When its temperature falls to about 600° C., the glass surface is no longer damaged by contact with a metal roller, so the solidified sheet glass is subsequently carried away by the conveyor 28.

In the manufacture of sheet glass employing the apparatus of the present invention, the amount of molten glass flowing through the slit can be precisely controlled over its entire width by measuring the widthwise thickness of a resultant sheet of glass, and automatically controlling the vertical positions of each of the small dampers which together form the upper edge of the entire width of the slit, depending on the thickness of the sheet glass as measured across the width of the sheet glass. Thus sheet glass of uniform thickness across its width can be continuously obtained.

The damper is formed of a porous material, and when a pressurized gas is fed into it, due to its elevated pressure, the gas blows out through the surface of the damper through the numerous, fine voids in the porous material to form and maintain a thin film of the gas between the damper surface and the molten glass layer flowing thereunder or therethrough. Consequently, the glass layer does not come into direct contact with the damper, so the damper surface is not corroded by the glass. Furthermore, as the gas also blows out from the interfacing surfaces of the divided, small dampers, adhesion of the glass to such surfaces is likewise prevented, and the adjustment of the vertical position of the damper is made easy. The upper surface of the sheet glass after passing through the slit of this invention is smooth and lustrous.

It is also possible to form the side walls of the slit of this invention from a porous material, so that a pressurized gas introduced thereinto may blow out of the surfaces of the side walls. Furthermore, an end portion of the lower lip of the slit can be made from a porous material, and a gas under pressure may similarly be fed thereinto.

In order to finish the sheet glass which has left the slit into a product having surfaces having still greater smoothness and lustre, the sheet glass may be successively led to a bath of molten metal.

When the sheet glass having a uniform thickness across its width as it passes through the slit is further led onto a bath of molten metal, the glass surface is still evenly leveled and becomes smoother. Accordingly, the length of the molten metal bath employed in the present invention can be considerably shorter than that conventionally required.

As has been described, by employing a slit as described in the present invention, it becomes easy to manufacture a continuous sheet of glass of a desired, uniform thickness over its entire width having smooth, lustrous surfaces, by means of feeding a gas under pressure to a damper comprising a porous material, which is divided into a plurality of smaller dampers forming the entire width thereof, and controlling the vertical position of the smaller dampers. This invention furthermore has other conspicuous advantages, such as higher efficiency, over the prior art and the necessity of using a long molten metal bath is dispensed with.

What we claim is:

1. An apparatus for use in the production of sheet glass comprising a tank containing a bath of molten metal, a container for molten glass positioned directly adjacent to said tank, one wall of said container having a horizontal elongated slit therein which is adapted for the molten glass to be delivered therethrough and directly onto the bath of molten metal, the portion of said wall above said slit comprising a plurality of closely adjacent vertically movable damper members each having a hollow interior, the front, back, side and bottom portions of each damper member adjacent to the slit and extending upwardly away from the slit a short distance and defining the hollow interior being gas-permeable, and means for supplying gas to the interior of said gas-permeable portion of each said damper member, whereby the sheet glass passing through the slit is given a uniform thickness and a smooth and lustrous upper surface, and the individual damper members are kept free of solidified glass so that they can be freely moved relative to each other.

2. An apparatus as claimed in claim 1 in which one side edge of each damper member has an elongated abutment thereon and the other side has a complementarily shaped recess, the abutments on the one sides engaging in the corresponding recesses on the other side of the adjacent damper members of guiding the movement of the damper members relative to each other.

References Cited

UNITED STATES PATENTS 3,305,338  2/1967  Robinson.

DONALL H. SYLVESTER, *Primary Examiner.*

E. R. FREEDMAN, *Assistant Examiner.*

U.S. Cl. X.R.

65—25, 65, 99